United States Patent [19]
Gorelik

[11] Patent Number: 5,844,605
[45] Date of Patent: *Dec. 1, 1998

[54] ANALOG PROCESSING ELEMENT (APE) AND RELATED DEVICES

[75] Inventor: Vladimir Gorelik, Wilmington Island, Ga.

[73] Assignee: Integrated Data System, Inc., Savannah, Ga.

[ * ] Notice: The term of this patent shall not extend beyond the expiration date of Pat. No. 5,766,288.

[21] Appl. No.: 854,461

[22] Filed: May 12, 1997

Related U.S. Application Data

[63] Continuation of Ser. No. 369,940, Jan. 6, 1995, Pat. No. 5,764,288.

[51] Int. Cl.$^6$ .................................................. H04N 5/335
[52] U.S. Cl. .............................................................. 348/311
[58] Field of Search .................................. 348/311, 312, 348/313, 314; 395/800; 364/221, 516; 382/278, 103; 257/216, 248, 247; H04N 5/335

[56] References Cited

U.S. PATENT DOCUMENTS

| | | |
|---|---|---|
| 3,662,104 | 5/1972 | Nordseth et al. . |
| 4,443,855 | 4/1984 | Bishop et al. . |
| 4,468,727 | 8/1984 | Carrison et al. . |
| 4,524,455 | 6/1985 | Holsztynski et al. . |
| 4,538,182 | 8/1985 | Saito et al. . |
| 4,550,437 | 10/1985 | Kobayashi et al. . |
| 4,616,262 | 10/1986 | Moriyama . |
| 4,660,090 | 4/1987 | Hynecek . |
| 4,692,892 | 9/1987 | Anizan et al. . |
| 4,806,498 | 2/1989 | Fujii . |
| 4,817,175 | 3/1989 | Tenenbaum et al. . |
| 4,852,183 | 7/1989 | Abe et al. . |
| 4,908,751 | 3/1990 | Smith . |
| 4,952,523 | 8/1990 | Fuji . |
| 4,982,439 | 1/1991 | Castelaz . |
| 4,991,111 | 2/1991 | Crookshanks . |
| 5,077,592 | 12/1991 | Janesick . |
| 5,182,623 | 1/1993 | Hynecek . |
| 5,212,742 | 5/1993 | Normile et al. . |
| 5,250,824 | 10/1993 | Janesick . |
| 5,286,990 | 2/1994 | Hynecek . |
| 5,499,195 | 3/1996 | Castelaz . |

OTHER PUBLICATIONS

Kinugasa et al., Electronic Image Stabliizer for Video Camera Use, Aug. 1990, IEEE Trans. On Consumer Electronics.

*Primary Examiner*—Wendy Garber
*Assistant Examiner*—Tuan V. Ho
*Attorney, Agent, or Firm*—Thomas, Kayden, Horstemeyer & Risley

[57] ABSTRACT

Disclosed is an analog processing element (APE) for the analog processing of charge packets present in an analog signal. The APE utilizes CCD-based elements in a semiconductor device to move and process charge packets present in an analog signal. In one embodiment, the APE provides analog processing on dimensional signals such as audio or video signals. When the APE is embodied in a semi-conductor device, it may be provided as a chip for analog pre-processing of video or audio signals such as for compression of the signal prior to digitization and use by digital processing devices. In a particular embodiment, an array of APE's, along with related circuitry provides for a pipelined Pattern Recognition Processor (PRP). The PRP may perform analog video compression at rates substantially exceeding compression rates available with current digital processing technology.

23 Claims, 9 Drawing Sheets

TOPOLOGY OF AN APU WITH 2D CCDCS CHARGE SHIFTERS

CCDCS WITH EMBEDDED QSENSOR

CCDCS WITH EXTERNAL QSENSOR

FIG. 3 TOPOLOGY OF AN APU WITH 2D CCDCS CHARGE SHIFTERS

FIG. 4 — TOPOLOGY OF A 4X4 PBU WITH CCDCS-HOLD REGISTER

FIG. 8 SPIRAL SEARCH ALGORITHUM

ANALOG PROCESSING ELEMENT (APE) AND RELATED DEVICES

This application is a continuation of application Ser. No. 08/369,940, filed on Jan. 6, 1995, U.S. Pat. No. 5,764,288.

BACKGROUND OF THE INVENTION

1. Technical Field

This invention relates generally to semiconductor technology, and in particular, to properties, topology and technology of new semiconductor elements, and arrangement of the elements into a structure capable of parallel, real time processing of incoming 1D or 2D data streams.

2. Description of the Prior Art

All known data compression procedures require incoming data streams to be presented in a digital format. Incoming analog data must be converted into some form of digital presentation before the processing hardware is able to execute its compression algorithm.

Most current, digital-based, hardware devices are intrinsically sequential. This means that it processes data in the sample-by-sample order the data is received. Although limited by this inherent trait, some topflight equipment, such as the most powerful Digital Signal Processors and RISC based processors, perform this function with a high degree of efficiency with the implementation of special architecture and/or other high technological solutions. Also, other devices, like multiprocessor systems or highly-pipeline processor chips, can split an incoming signal into multiple parallel data streams, and process it in parallel, or pipeline it.

Some of the most advanced current data processing applications for consumer, military and industrial products are in the general grouping of audio and video processing devices. But the nature of signals in audio and video data streams are totally dissimilar.

An audio data stream is a function of a time only, f(t). Real audio signals are produced by three different sources: voice, music and background noise. In most cases, a real signal is the sum of all three components. The most complicated task is that of separating voice and music from noise due to the extremely subjective properties of each of the signal components. However, as soon as these components become defined and separated, the problem shifts to that of sound recognition and data compression.

Perceptually, voice sounds can be represented by a stream of phonemes. Each phoneme carries text related information and individual voice characteristic information. The text related component is essentially a stream of symbols, such as speech sounds of a given language or alphabet. Individual voice characteristic information can be represented by a number of coefficients that embody the acoustical characteristics of the vocal tract and articulation of a speaking person. In some transactions, such as telephone conversations or during teleconferences, both components are important. In others, data entry or machine control for example, only the first component of a voice is important.

All existing voice recognition algorithms are based on digital processors that either recognize only a small, pre-defined number of words from a particular person in real time, or a larger vocabulary from a broader range of voices, but at a rate significantly slower than real time. The reasons for the limitations lie in the inherently iterated characteristics of audio recognition algorithms and in the inefficient ability of state-of-the-art digital processors to perform these particular tasks.

Voice compression can be achieved by comparing an incoming audio sequence with a predefined set of voice components like phonemes or syllables. However, the English language contains more than 4,000 different syllables, as defined by phonemes alone, and if the prosodic variations are also included, the number of syllables approaches 31,000. Allophonic variations of all the syllables again greatly increase the amount. This is too large a number of syllables to analyze, and too many decisions that must be made correctly, to allow existing digital techniques to maintain real-time speech rates, which are three to seven syllables per second.

A video data stream is a function of time and two or three space coordinates, $f(t,x,y,z)$. Video transducers, like TV cameras, generate a sequence of video frames at a specified rate—i.e. 30 frames per second, which is the time component of $f(t,x,y,z)$. In the case of a gray-scale image, each frame is represented by one 2D array of pixels. Color images are represented by three (Red, Green and Blue) 2D arrays of pixels. One commonly used frame size is 640×480 pixels per frame, and at 30 frames per second and three color planes per pixel, equates to $(640 \times 480 \times 30 \times 3) = 27,648,000$ bytes per second.

Most video data compression algorithms use noise and redundancy reduction procedures in both time and/or spacial domains. Under normal conditions, video images contain a significant amount of redundant information that can be removed from a signal without sacrificing image quality. For example, two camera images, one of a sheet of white paper and the other a human face, will contain the same number of pixels, but different levels of redundancy. A more complicated example would be an image depicting leaves of a tree, or the tree itself. It is extremely complicated and excessively time consuming to search out similarities between blocks of pixels within a video frame, and similar pixel blocks between two sequential frames. This makes even the most recent video compression/decompression technology highly asymmetrical, meaning compression time greatly exceeds "real time" decompression. Even the highly touted video compression algorithms, such as FRACTAL TRANSFORM and MPEG, using the most powerful, modern computers, can not perform such a complex task in real time. The same problem restricts transfer of video information, in real time, via conventional telephone lines.

A large class of other compression algorithms use noise and redundancy reduction procedures in both time and/or spatial domains.

The above described shortcomings, and other shortcomings of the prior art of audio and video processing technology, are effectively overcome by the present invention, as described in further details below.

SUMMARY OF THE INVENTION

It is therefore an object of the present invention to provide improved CCD technology.

It is another object of the present invention to provide a CCDCS device capable of measuring the level of charges during it motion along the line of CCDCS.

It is another object of the present invention to provide a CCD topology, that allows the movement of charges forward and reverse, in both vertical and horizontal directions.

It is another object of the present invention to provide CCD technology that combines analog and CCD elements on a single silicon die.

It is another object of the present invention to provide the conception of an Analog Processing Unit (APU)

It is another object of the present invention to provide the conception of a Pixel Block Unit (PBU).

The above and further objects are achieved in a device made in accordance with the preferred embodiments of the present invention. In one embodiment, a charge coupled device with embedded charge sensor is provided for the processing of individual charge packets in the nature of moving the charge packets in forward and reverse directions and sensing the value of the charge in a charge packet. In this embodiment, the charge coupled device with embedded charge sensor includes a first clock electrode for controlling the depth of the potential well adjacent the first clock electrode, a second clock electrode, spaced apart from the first clock electrode for controlling the depth of the potential well adjacent the second clock electrode. A controller provides clock signals to the clock electrodes in a desired manner and a charge sensor having a charge sensing element is positioned between the first and second clock electrodes for sensing the value of any electrical charge present between the electrodes.

In a further embodiment of the charge coupled device with embedded charge sensor, the charge sensor further includes a virtual electrode embedded in a silicon die between the first and second clock electrodes and a gateless field effect transistor positioned above the virtual electrode. In an alternate embodiment, a virtual electrode is embedded in a silicon die between the first and second clock electrodes and a field effect transistor having a gate is also provided. The gate of the field effect transistor extends into an area above the virtual electrode while the field effect transistor may be positioned in any desired location.

In a further device made in accordance with the invention described herein, an analog processing element semiconductor device is provided. An analog processing element processes individual charge packets in a series of sequential frames of dimensional analog electrical signals in a desired manner. The analog processing element includes a present charge site for holding and sensing the value of an analog charge packet and directing the movement of the analog charge package in accordance wit the desired processing of the signal. The analog charge packet present at the present charge site is part of the present frame of the sequential frames of a dimensional signal being processed. Also provided is a previous charge site for holding and sensing the value of an analog charge packet and directing the movement of the analog charge packet in accordance with the desired processing of the signal. The analog charge packet present at the previous charge site is part of the immediate previous frame in the series of sequential frames of the dimensional signal being processed. Also provided on the analog processing element is a buffer for holding an analog charge packet during loading and draining of the analog processing element with the charge packets of the signal to be processed. A stack for holding an analog charge packet during the loading and draining of the analog processing element with the charge packets of the signal to be processed is also provided. A reference site for holding an analog charge packet comprising a reference value for use in the processing of charge packets of the signal to be processed is further provided. Finally, a drain is provided which provides an outlet to ground for zeroing unnecessary charge packets from the analog processing element.

A subtractor determines a charge differential between charge packets located at the present charge site means and the previous charge site means. The subtractor performs a nonlinear transformation of the differential and generates an analog output corresponding to a function of the charge differential. An adder generates the sum of output values of a subtractor located on the analog processing element and another output signal. Finally, a sequence controller controls the movement of the charge packets among the current charge site, previous charge site, buffer site, stack site, reference site and drain and controls the functioning of the subtractor.

In a further embodiment of this device, the analog processing element includes charge coupled devices with embedded charge sensors as the present charge site and the previous charge site.

In a further embodiment made in accordance with the present invention, there is a provided a pixel block unit for use in an analog two-dimensional information processing device. The processing device is adapted to process an analog signal consisting of individual charge packets. The typical analog signal being processed would be composed of a sequential series of frames. In this embodiment, the pixel block unit includes a two-dimensional array representing a square matrix of analog processing elements. The analog processing elements are positioned in a horizontal and vertical disposition relative to each other and define rows and columns along which charge packets representing information from the input signal can move. The analog processing elements receive the individual charge packets representing information in each of the sequential series of frames and processes a charge packet representing information from a current frame and a charge packet representing information from a the frame immediately preceding the current frame and generates an output corresponding to a predefined function of the difference of the value of present and previous values of the charge packets.

An analog adder is associated with each of the analog processing elements in each of the rows for receiving the output signal generated by the preceding analog processing element, adding it to the output signal generated by the analog processing element with which the adding means is associated and generating an output signal corresponding to the sum of the signals while providing the sum as an output. A sequence unit receives the output signals from the adders associated with the last analog processing element in each row and generates signals corresponding to the spatial location of the most similar charge packet values for the current frame relative to the previous frame as determined by the analog processing elements. Further, there is provided an external controller for providing control and clock signals which allow for the operation and timing of the pixel block unit.

In a further embodiment, the sequence unit of the pixel block unit further includes a sequence control subunit for receiving the output signals of each of the adders associated with the last analog processing element in each row of the matrix of analog processing elements. These output signals are added to generate a block sum signal corresponding to the sum of the signals. The sequence control subunit further operates to hold the block sum signal for further use, compare the block sum signal to previously stored values to determine if the block sum signal represents a greater correspondence of the charge packet values of the present frame to the previous frame and the value of the previously stored signal and, if the value represents a greater correspondence, generates signals to replace the previously stored value with the new value and to strobe the external signal that describes the position of the greatest correspondence in the array of analog processing elements. A spiral sequence subunit holds a signal corresponding to the position of the greatest correspondence between present and previous frame charge packets, the position is represented as a spiral passing through each of said analog processing elements with the signal representing the relative location in pixels from the center of such a spiral where the correspondence occurs. A quadrant sequence subunit holds the signal corresponding to the position of the greatest correspondence between present and previous frame charge packets with the position being represented as a group of four quadrants. Each of the quadrants includes a portion of the analog processing elements and the signal represents the quadrant in which the correspondence occurs.

Finally, the sequence unit includes an offset sequence subunit for holding a signal corresponding to the position of the greatest correspondence between the present and previous frame charge packets. This position is represented as an offset from the beginning of a quadrant in a number of pixels. The signal represents the relative location of the rectangle in which the correspondence occurs.

In a further embodiment of the pixel block unit, each of the analog processing elements includes the features previously described with respect to the analog processing elements.

In a further embodiment of the present invention, a pipelined pattern recognition processor is provided for the analog processing of video signals represented by a series of sequential two-dimensional frames of pixels. The pixels are comprised of individual packets of charge and the pattern recognition processor generates analog information in the nature of relative pixel location as compared to sequential frames. This analog information provides the location of corresponding pixels as the location changes from one frame to the next. The pattern recognition processor includes an external controller for providing controlling clock signals to the pattern recognition processor and for receiving data from the pattern recognition processor. Also included is a video input for providing an analog video signal comprising a sequential series of two-dimensional frames of pixels as input to the pattern recognition processor. A reference input is provided for providing an analog reference signal comprising predetermined two-dimensional frames of pixels. Further, the pattern recognition processor includes at least one pixel block unit as described previously which receives at least a portion of the sequential frames of the analog video signal or a frame of the analog reference signal and compares at least a portion of one of the sequential frames of the analog video signal to at least a portion of the next sequential frame of the analog video signal. The pixel block unit further determines the location of the pixel blocks in the next sequential frame of the analog video signal which correspond to pixel blocks in the previous sequential frame of the analog video signal and generates an analog output signal corresponding to the location. Also provided in the pattern recognition processor is an analog output shift register for receiving the analog output signal of the pixel block units and maintaining the analog output signal for output when required by the external processor. Finally, drain elements are provided for draining all charge packets for the pattern recognition processor according to control input from the external controller.

In a further embodiment, the pattern recognition processor further includes an overscan buffer which includes a plurality of charge packet storage sites for storing charge packets representing pixels in an analog video signal during processing of an analog signal by the pixel block unit. Also included is a video line register line for receiving one line of a frame of an analog video signal and providing the line to the overscan buffer means and to at least one pixel block unit along with a reference line register means for receiving one line of a frame of an analog reference signal and providing the line to the overscan buffer.

In a further embodiment of the present invention, the pattern recognition processor is adapted to provide for processing of an analog video signal and compression of that signal to provide a compressed analog video output for further processing by a general purpose computer or video signal processor. In this embodiment, the pattern recognition processor compares sequential frames of an analog video signal to locate the relative position of corresponding pixels from frame to frame. Thus, by storing an initial frame of an analog video signal in memory, and generating the location of groups of pixels for each in a sequence of frames relative to each frame in the sequence, the video signal may be compressed by storing only the initial frame of the video signal and the location of the groups of pixels as they move from frame to frame. The analog processing of the video signal provides for much more rapid processing than is currently available with digital signal compression technologies.

DETAILED DESCRIPTION OF A PREFERRED EMBODIMENT

Summary of Components

Figure 1:
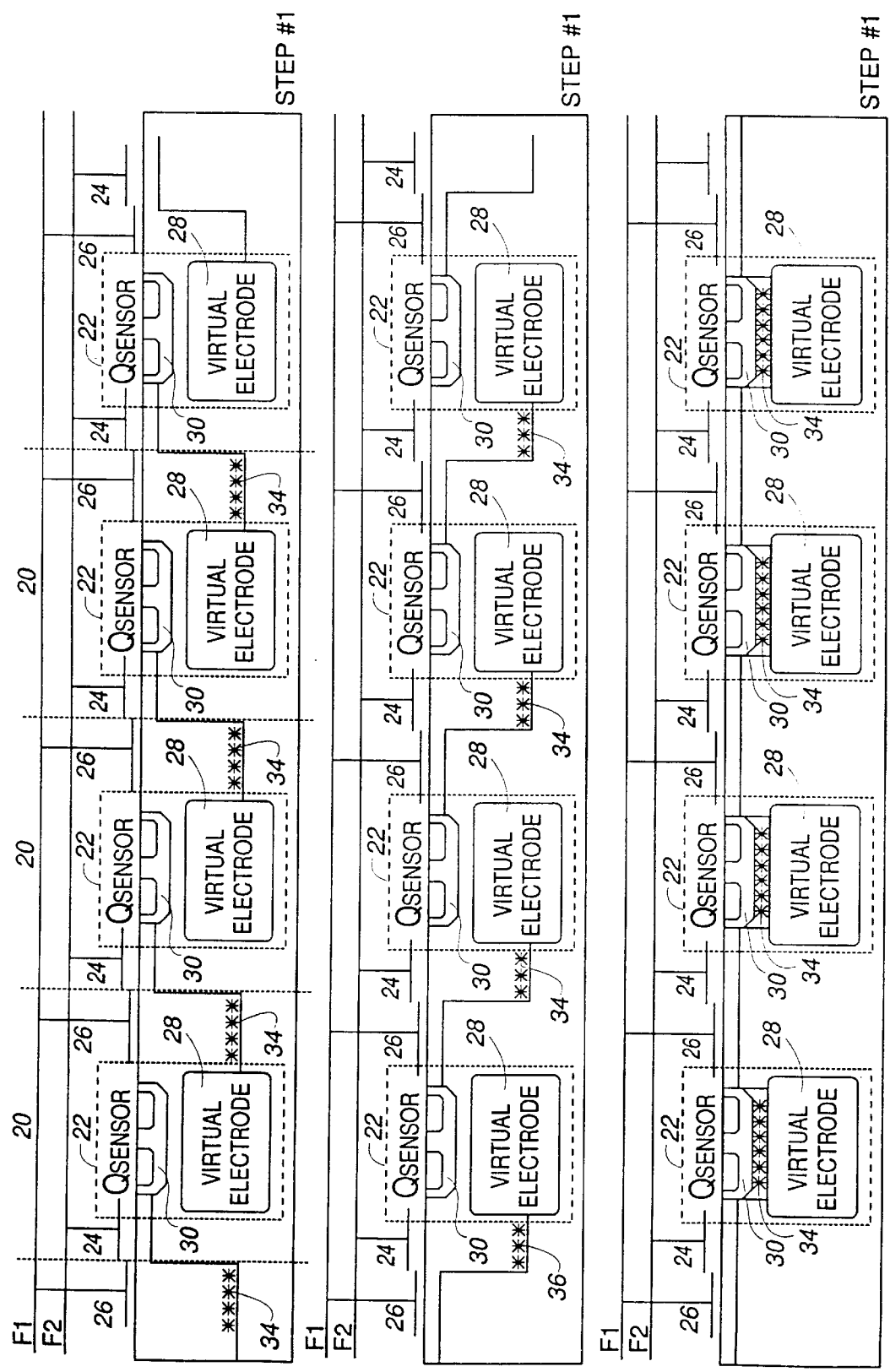
FIG. 1 shows a schematic diagram of a CCDCS with embedded Qsensors.

Referring now to the Figures in which like reference numerals indicate like or corresponding elements, the components of the present invention will be briefly described. Following this description, the architecture and operation of the invention will be described in detail. In accordance with the teachings of the present invention, a new conception of data processing is provided wherein one of the most computational intensive components of image processing algorithms is performed with the use of 2D arrays of special CCD-based Analog Processing Elements (APE). A Charge Coupled Device (CCD) is a special semiconductor structure that allows the movement of charge packets along a line of CCD elements by applying controllable voltage to clock electrodes. The electric field of the electrodes controls the depth of potential wells above the electrode, and forces a charges to move forward or reverse.

Figure 2:
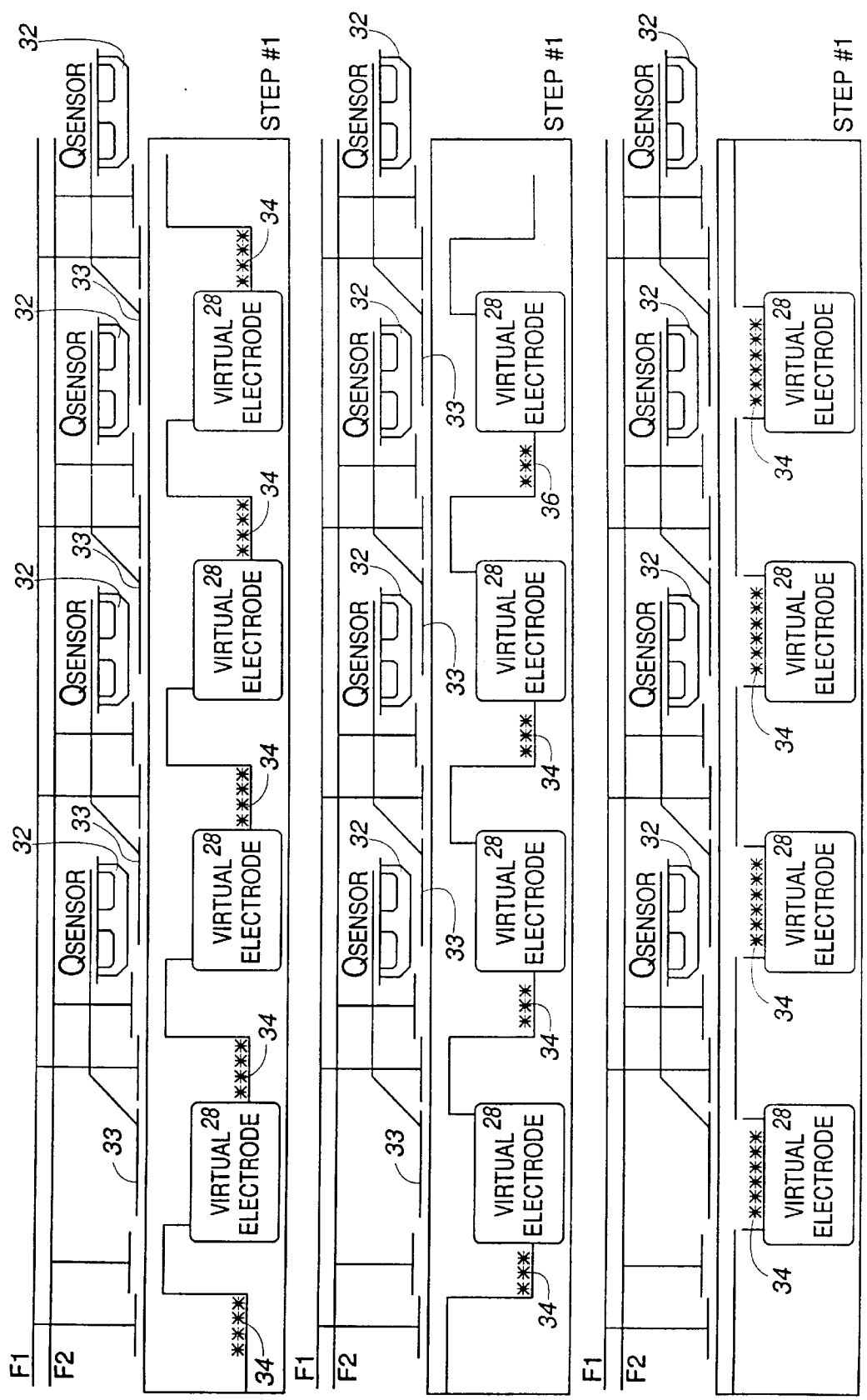
FIG. 2 shows a schematic diagram of a CCDCS with external Qsensors.
Figure 3:
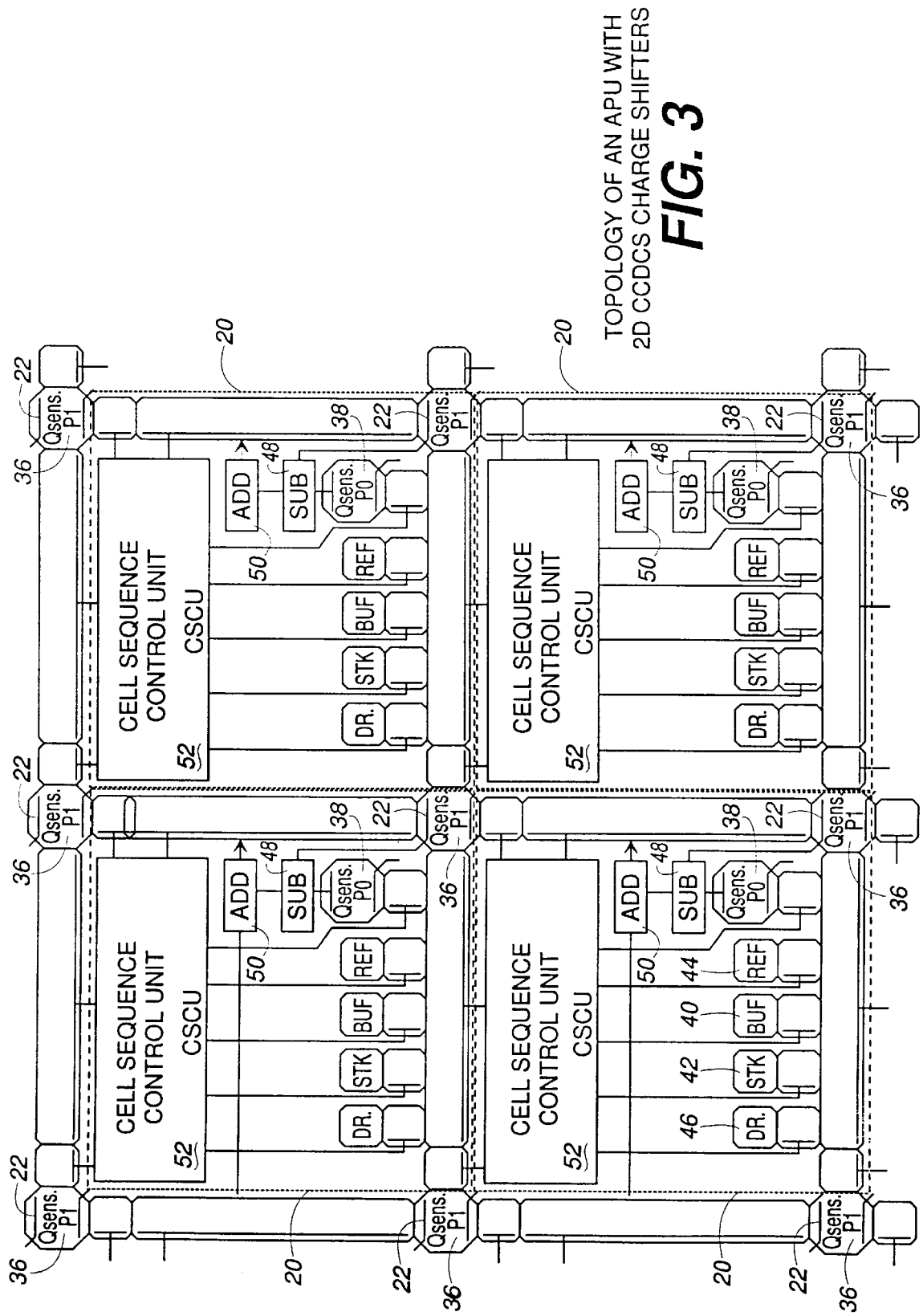
FIG. 3 shows an APE.

Referring now to FIG. 1, 2 and 3, each APE 20 (FIG. 3) is comprised of a crossed-pair of two specially fabricated Charge Coupled Devices with Charge Sensor elements (CCDCS) or Qsensors 22. Each CCDCS element incorporates a non-destructive Charge Sensor 22, embedded between two adjacent clock electrodes 24, 26, into the linear CCD elements. A charge sensor 22 is comprised of a "virtual" electrode 28 embedded into a silicon die and a gateless Field Effect Transistor (FET) 30 located just above the virtual electrode 28 (FIG. 1). In another embodiment (shown in FIG. 2), a gated FET 32 is located separately and has a gate electrode 33 extended to the area just above the "virtual" electrode 28. This combination, at a predefined point in time, concentrates a charge 34 in the area just above the channel of the FET 30 or extension of a gate electrode 33 of the FET 32 during its movement from one CCDCS to another (step #3 of FIG. 1 and FIG. 2). In this case, the charge will control the current in a FET 30 or 32 in the same manner voltage on a gate controls the current in conventional FET applications.

Figure 6:
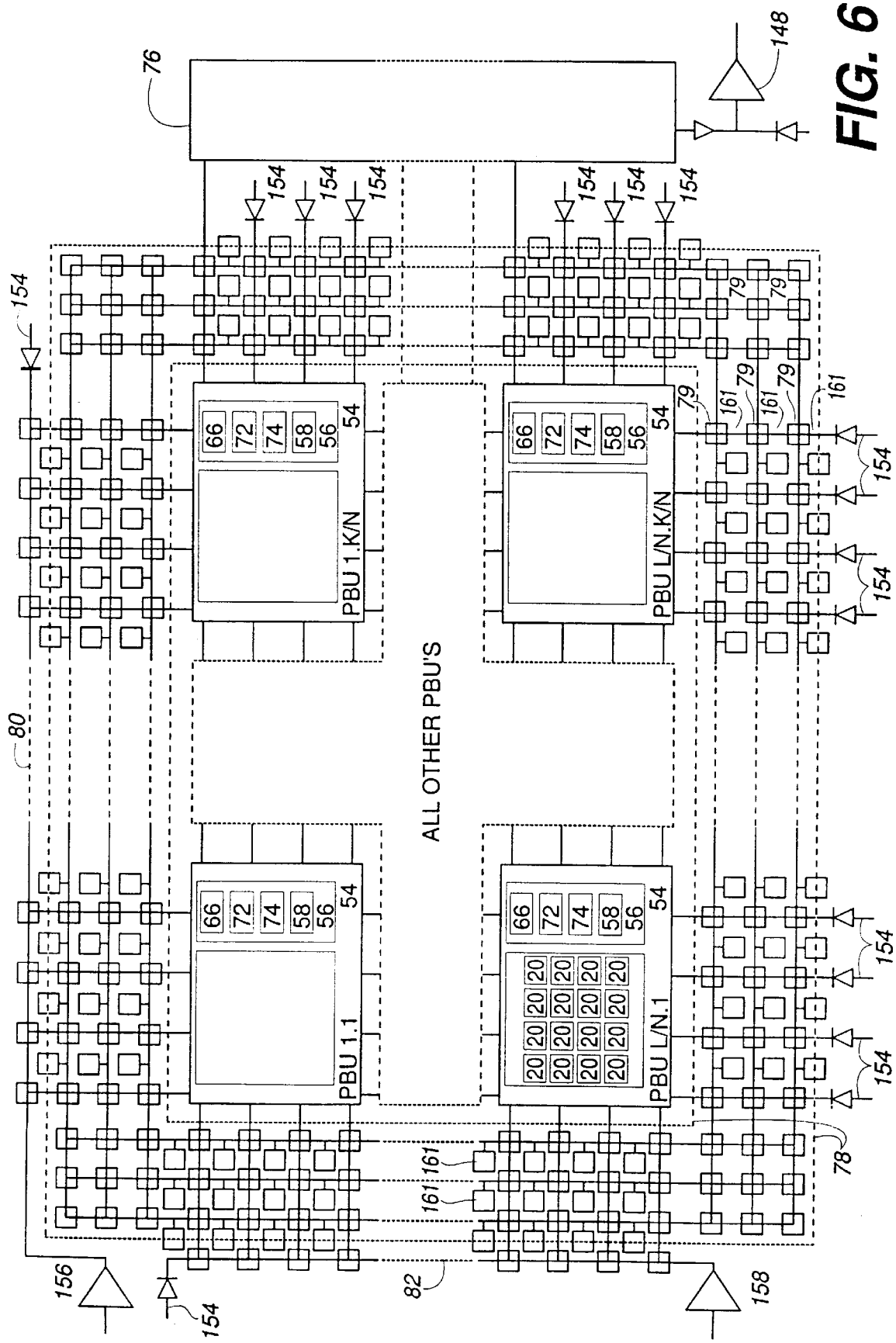
FIG. 6 shows the structure of a compression chip.

Also, the invention relates to the structure of a special type of highly pipelined PATTERN RECOGNITION PROCESSOR (PRP) 64 (shown in FIG. 6). The PRP 64 will:

1. receive an incoming data stream from a series of video frames, in an analog format;
2. compare the most current frame with the frame preceding it;
3. identify relative locations of the best matching 2D groups of pixels in the current frame and the previous frame, pre-loaded into internal analog memory; and
4. drain the results of a previous comparison cycle out of chip into an external processor; all of which are performed in parallel.

The PATTERN RECOGNITION PROCESSOR (PRP) 64 is comprised of an L×K array of elementary ANALOG PROCESSING ELEMENTS (APE) 20 organized into L/N× K/N array of PBUs 54 with additional circuitry (FIG. 3 and FIG. 6.) FIG. 3 shows the construction and architecture of a 2×2 array of APE's 20. A PRP chip 64 would consist of an array having a grid size equal to the expected frame size of an incoming data frame. For example, if the incoming signal were a monochrome video signal having a resolution of 640×480, then the APE 20 array would have a similar dimension. Additionally, for color video signals, a similar array of APE's 20 would be necessary for each color component, typically three for the primary video colors (red, green and blue).

Referring now to FIG. 3, a crossed pair of two CCDCS constructs a site for a current PLANE1 (P1) element 36, and also allows it to redirect the charge flow from the horizontal direction to the vertical, and reverse. In addition to the two crossed CCDCS, the APE 20 includes:

PLANE0 (P0) 38, an immovable CCDCS element to hold the pixel value from a previous frame;

BUFFER (BUF) 40 and STACK (STK) 42, standard CCD elements (having clock electrodes to move or hold charges, but not having the embedded charge sensor 22 of a CCDCS element) to support data consistency during pipeline frame loading and data drain at the end of a frame;

REFERENCE (REF) 44, a CCD element whose function is that of preventing pixel data degradation during processing of a long frame sequence;

DRAIN (DR) 46, to zero unnecessary charges;

ANALOG SUBTRACTOR (SUB) 48, a differential amplifier with a sign converter constructed from two FET charge sensors 22, described above. It determines the charge differential between two circuits and raises the difference to a power of two. The purpose of a SUB 48 is to generate the pixel differences) between P0 38 and P1 36, take the absolute value of the difference, and raise the difference to a power of two;

ANALOG ADDER (ADD) 50, adds the output value of a corresponding SUB 48 to the output value of a previous APE 20;

CELL SEQUENCE CONTROL UNIT (CSCU) 52, controls charge motions between different CCD sites in an APE 20.

Figure 4:
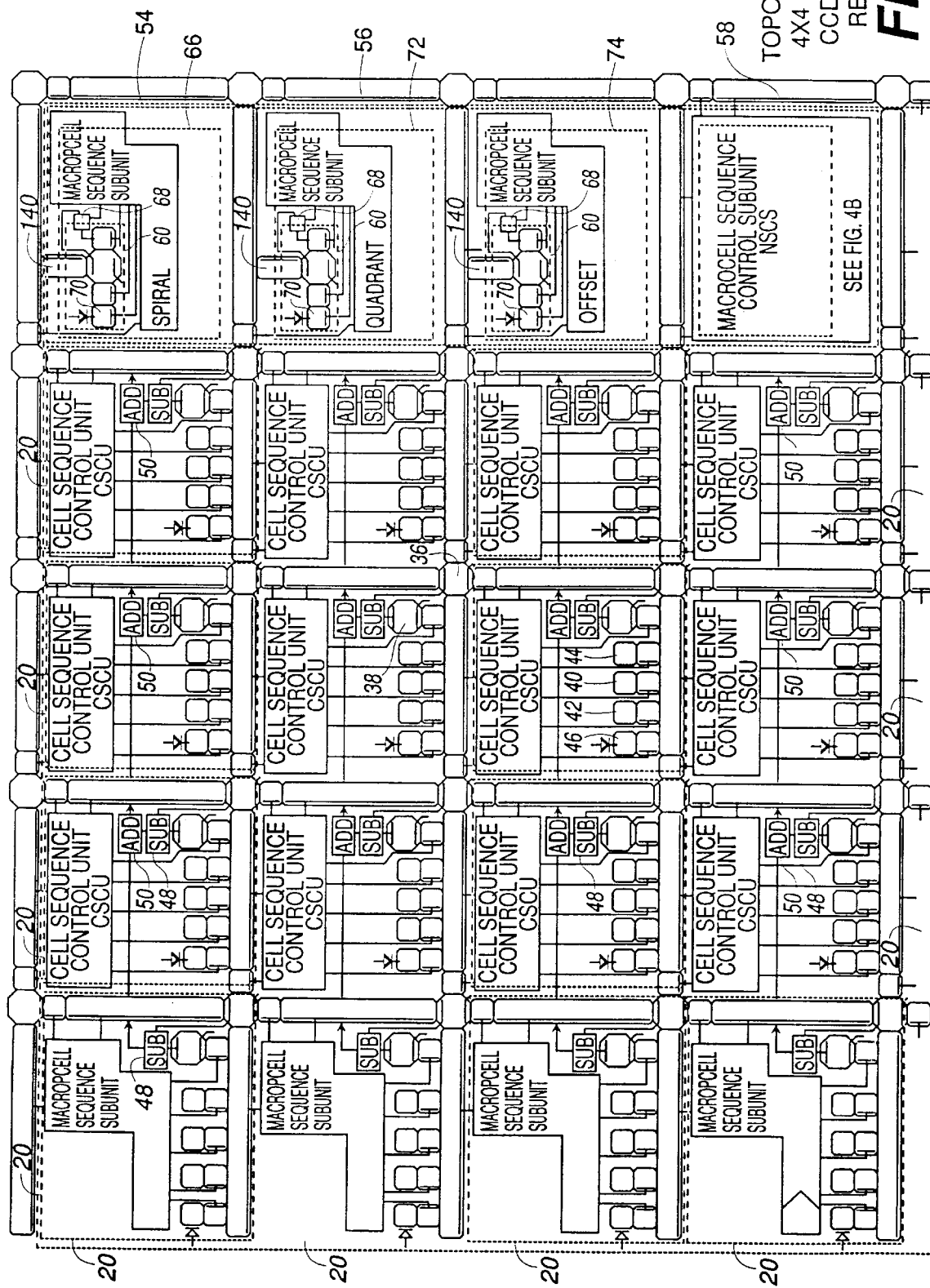
FIG. 4 shows the topology of a 4×4 PBU with a CCDCS-Hold register.

Referring now to FIG. 4, a 2D array of N×N (N=4) APE's 20 is shown which makes up a Pixel Block Unit (PBU) 54. As was described previously, the number of APE's 20 in an array will depend upon the desired signal frame size for the incoming signal. The PBU 54 is an array of APE's 20 along with associated circuitry which allows for the proper processing of a signal. To construct a PRP chip 64, an appropriate number of PBU's are provided and combined with additional circuitry, which will be described with respect to FIG. 6.

The function of a PBU is governed by the following equation:

$$IV \sum_{i,j=1}^{N} f\{|[Pi,j(0)\_Pi,j(1)]|\};(1). \qquad \text{Equation 1}$$

where:

IV=Intermediate Value,

Pi,j(0)=PLANE0 pixel value,

Pi,j(1)=PLANE1 pixel value, i and j=indexes in N×N array of elements.

Figure 5:
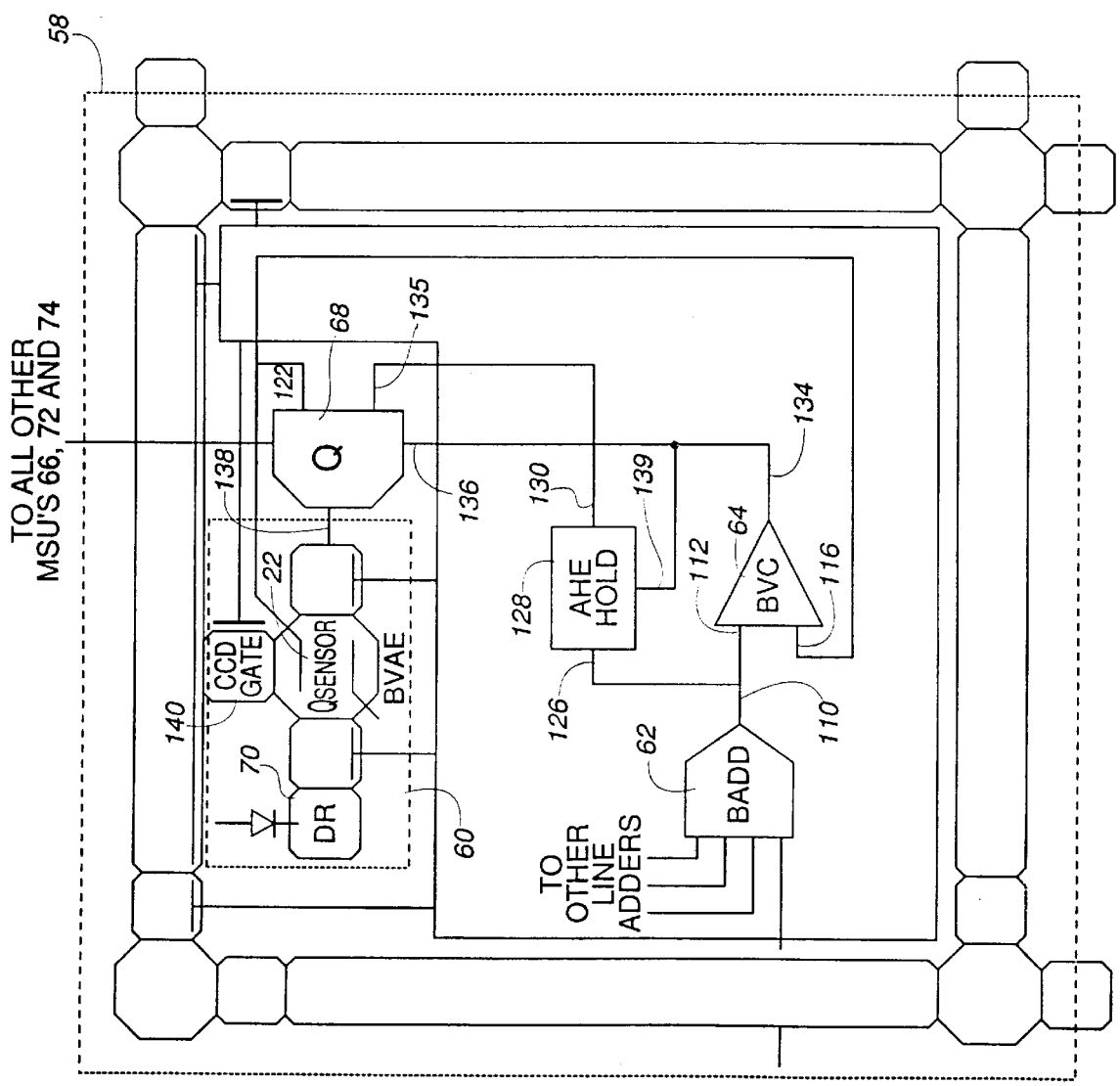
FIG. 5 shows the structure of a Macrocell Sequence Control Subunit (MSCS)

In addition to an N×N size APE, the PBU includes a MACROCELL SEQUENCE UNIT (MSU) 56, subdivided into four MACROCELL SEQUENCE SUBUNITS (MSS) 58, 66, 72, 74:

Referring now to FIGS. 4 and 5 the structure of a MACROCELL SEQUENCE CONTROL SUBUNIT (MSCS) 58 is shown, consisting of:

a) BEST VALUE HOLD ELEMENT (BVHE) 60, a CCD that holds the best value (BV);

b) BLOCK ADDER (BADD) 62, four input analog adders generate output according to Equation (1);

c) BV COMPARATOR (BVC) 64, compares values in BVHE 60 and IV (output of the BADD 62); if IV is less than the value stored in the BVHE, MSCS 58 replaces the old value in BVHE 60 with a new one from IV;

The MSCS 58 is designed to control the functioning of a entire PBU 54, that includes:

MACROCELL SEQUENCE SPIRAL SUBUNIT (MSSS) 66, a CCDCS-based element with a CHARGE INJECTOR (Q) 68 and drain (DR) 70 sites, that holds a number of spiral steps during a SPIRAL SEARCH algorithm, which will be described in detail later.

MACROCELL SEQUENCE QUADRANT SUBUNIT (MSQS) 72, a CCDCS-based element with CHARGE INJECTOR (Q) 68 and drain (DR) 70 sites, that holds a descriptor of a quadrant at locations where the best matching pixel block value(s) have been found during a SPIRAL SEARCH algorithm.

MACROCELL SEQUENCE LINE OFFSET SUBUNIT (MSLOS) 74, a CCDCS-based element, with a CHARGE INJECTOR (Q) 68 and drain (DR) 70 sites, that holds a value representing the linear offset in pixels, from the beginning of a quadrant where the best matching pixel block value(s) have been found during a SPIRAL SEARCH algorithm.

Referring now to FIG. 6, a PRP chip 64 is shown. Due to size constraints the central circuitry of a chip is shown as a dashed area, and only the outermost corners of a processing area are depicted in detail. The central portion of the PRP 64 consists of an arbitrary number of PBUs. This number of which is limited only by system requirements and availability of technology. The PRP 64 contains:

OUTPUT SHIFT REGISTER (OSR) 76, which is a segmented, CCD-based analog shift register. The number of segments equals the number of PBU lines in a chip and each segment has 4×K CCD elements. The main purpose of the OSR 76 is to buffer values from the MSCS 58, MSSS 66, MSQS 72 and MSLOS 74 during the short period of time between the ending of a current frame and beginning of the next frame, and then, during the period that the next frame is being processed, drain the results of previous processing out of the chip into an external device in analog format.

OVERSCAN SEARCH BUFFER AREA (OSBA) 78, a CCD extension of the array of PBUs 54, which allows the array of PBUs 54 to accommodate image shifting from a processing area and prevent further destruction of pixel information. The OSBA 78 consists or a number of standard CCD elements 79 which allow for the transfer and holding of charges associated with the pixels of a frame to be processed. Also provided adjacent to each CCD element 79 is a SHELTER element 81, which allows storage of the charge from each CCD site 79 of the OSBA 78 during processing so that the information is preserved at the time of the next and reference frame loading sequence. The SHELTER sites 81 are standard CCD elements as well.

LOADING REGISTER (LR) 80, serves to buffer and synchronize the incoming data stream with internal chip timing and structure. Particularly during video processing, this register (TV-line SHIFT REGISTER 80) accumulates and holds pixel values for one TV line.

FEEDBACK REGISTER (FOR) 82 serves to buffer reference values generated by an external processor, and load the values into the REF CCD site 44 of a corresponding APE 20.

The PRP 64 represents a highly pipelined, mixed mode (analog/CCDCS-based) chip capable of performing real time pattern recognition of an incoming analog data stream.

Description of PRP Architecture

The chip takes advantage of the abilities of a special analog appliance called a CHARGE COUPLED DEVICE or CCD. This device is based on the ability of certain semiconductor elements to move electric charges from a previous element to the next, along an extended line (1,000,000 or more elements), virtually without charge loss. The advantages offered by this technique are based on the assumption that, in most cases, tolerances more stringent than 0.5% (8 bits in digital representation) for each sample is unnecessary, and it is possible to perform all sample processing in analog format. Therefore, since it is unnecessary to perform division, multiplication or other non-linear transformation of the charges themselves, it is less difficult to fabricate a silicon analog processing element in this accuracy range than one of digital architecture, since digital circuits require eight bits for each sample. A brief comparison shows an equivalent digital circuit needs at least 1300 transistors per sample, whereas the herein described CCD-based device uses only a few transistors per pixel.

In order to achieve the technology described above, in addition to conventional CCD technology, the conception is introduced herein of a CHARGE COUPLED DEVICE with embedded CHARGE SENSOR (CCDCS), which is a special CCD-based device that is able to measure on the fly the amount of electricity that moves along a line of CCDCS elements. The conception of a CCDCS utilizes the state of the art, three-electrode CCD technology, where one of the electrodes is substituted with a "Virtual Electrode" (28 of FIG. 1) embedded into the silicon die.

The "Virtual Electrode" 28 is fabricated into the silicon die, with the use of ion implantation or diffusion, followed by monosilicon epitaxial layer growth or other similar technology. The main purpose of a "virtual electrode" 28 is to shift the level of energy of a conductance band of silicon to an intermediate state, between the lowest and highest value of energy levels created by regular clock electrodes 24, 26. The voltage, applied to the two neighboring electrodes, shifts the energy level of a conductance band to a higher value, -relative to a "virtual electrode" level, and as a result the cloud of electron gas 34 that moves along the line of CCDCS elements will be locked in the area just above the "virtual electrode" (step #3, FIG. 1 and FIG. 2).

The advantage provided by this solution is the charge that carries the information about pixel luminance or crominance, and which is represented by an analog value of a signal, is not affected by the strong electric field that clock electrodes 24, 26 normally induce in semiconductor material. Two different solutions can be implemented for the charge sensor:

1. With embedded FIELD EFFECT TRANSISTOR (FET) (FIG. 1). In this case, the sensor element 30 of the Charge sensor (Qsensor) 22 will be fabricated just above the "virtual electrode" 28 and the electric field that is created by a an electron gas cloud 34 will directly control the current through the FET channel of a Qsensor 30. In this solution the Qsensor FET does not have a gate electrode. Although more difficult to fabricate, this solution is preferred.

2. With external FIELD EFFECT TRANSISTOR (FET) (FIG. 2). In this case, the Qsensor FET 32 will be fabricated any where on the silicon die, but it must have gate electrode 33 that is extended into the area above the "virtual electrode" 28. This solution increases the size of the silicon die and introduces unwilling capacitance, but may be less difficult to achieve because it does not require an epitaxial layer to be grown above the "virtual electrode" 28.

An additional advantage of employing of a "virtual electrode" 28 is that it is able to control bi-directional (forward and reverse) charge motions with only two clocked electrodes 24, 26, whereas a regular CCD uses three clocked electrodes. This reduction simplifies the processing techniques and device operations. Also, implementation of two, rather than three, clocked electrodes reduces the risk of surface damage and short circuits, and thereby increases the reliability of the device.

The processing area of a CCD-based PATTERN RECOGNITION PROCESSOR (PRP) 64 can be described as a matrix of K×L ANALOG PROCESSING ELEMENTS (APE) corresponding to a K×L pixel image structure. Each APE consists of two CCDCS elements that carry a charge representing the analog value of an incoming signal. In a particular case, it could be the R, G or B component of a corresponding pixel. All ensuing discussions refer to a gray-scale video signal, but color TV images can also be processed.

Each CCDCS element can shift a charge to its closest neighbor in both vertical or horizontal directions. Referring now to FIG. 3, four adjoining CCDCS (two in a line and two in a row) creates an APE 20. In addition to two CCDCS (one vertical and one horizontal) that intersect and create P1 36 or the current-frame-hold element, each APE 20 contains:

Four additional analog hold elements or sites as follows:

P0 38—a CCDCS-based previous frame hold element, to hold the value of a corresponding pixel in the previous frame;

STACK (STK) 42 to preserve the current pixel value while loading data from the line buffer;

BUFFER (BUF) 40 to prevent current loading data from corrupting during the time of frame compression;

REF 44 element to build-up a reference frame and hold the value of the corresponding pixel in it.

Additional elements provided on an APE 20 include, one DRAIN element (DR) 46 to drain and zero the charges from P1 36, P0 38, STACK 42, BUFFER 40 or REF 44 elements. One analog SUBTRACTOR (SUB) 48 to calculate the absolute value of the differences between corresponding pixel values in a previous frame (P0) 38 and the current frame (P1) 36, and raise it to a power of two. The output of the analog SUBTRACTOR 48 feeds directly to the first input of the corresponding cell ADDER. One analog cell ADDER (ADD) 50 is used to calculate the sum of differences between two signals. First input of the ADDER 50 receives the information from the corresponding cell SUBTRACTOR 48, the second input of the ADDER 50 receives the output of the previous (left-hand neighbor) cell ADDER 50. The output of the ADDER 50 is fed to the second input of the next cell ADDER 50 (Refer to FIG. 3 and FIG. 4) where the configuration of sequential ADDERS 50 is shown).

One CELL SEQUENCE CONTROL UNIT (CSCU) 52 performs low-level control of each APE 20 and generates the necessary clock sequences for synchronization of internal APE 20 circuitry.

Referring now to FIG. 4, each N×N block of pixels or APE's 20 (for the following description, N=4) form a PBU 54. In this description, a PBU 54 consists of four horizontal lines with four APE's 20 in each line. Most left-handed APE's in each line do not have ADDERs 50, because they do not have left-side neighbors in the current PBU 54. The data output of all ADDER's 50 on the far right of each line of APE's 20 are connected to, and provide the input for, a corresponding four-input analog BLOCK ADDER (BADD) 62 FIG. 5 of the MACROCELL SEQUENCE CONTROL SUBUNIT (MSCS) 58 corresponding to each PBU 54 (MSCS 58 and BADD 62 are shown in FIG. 5).

Figure 7:
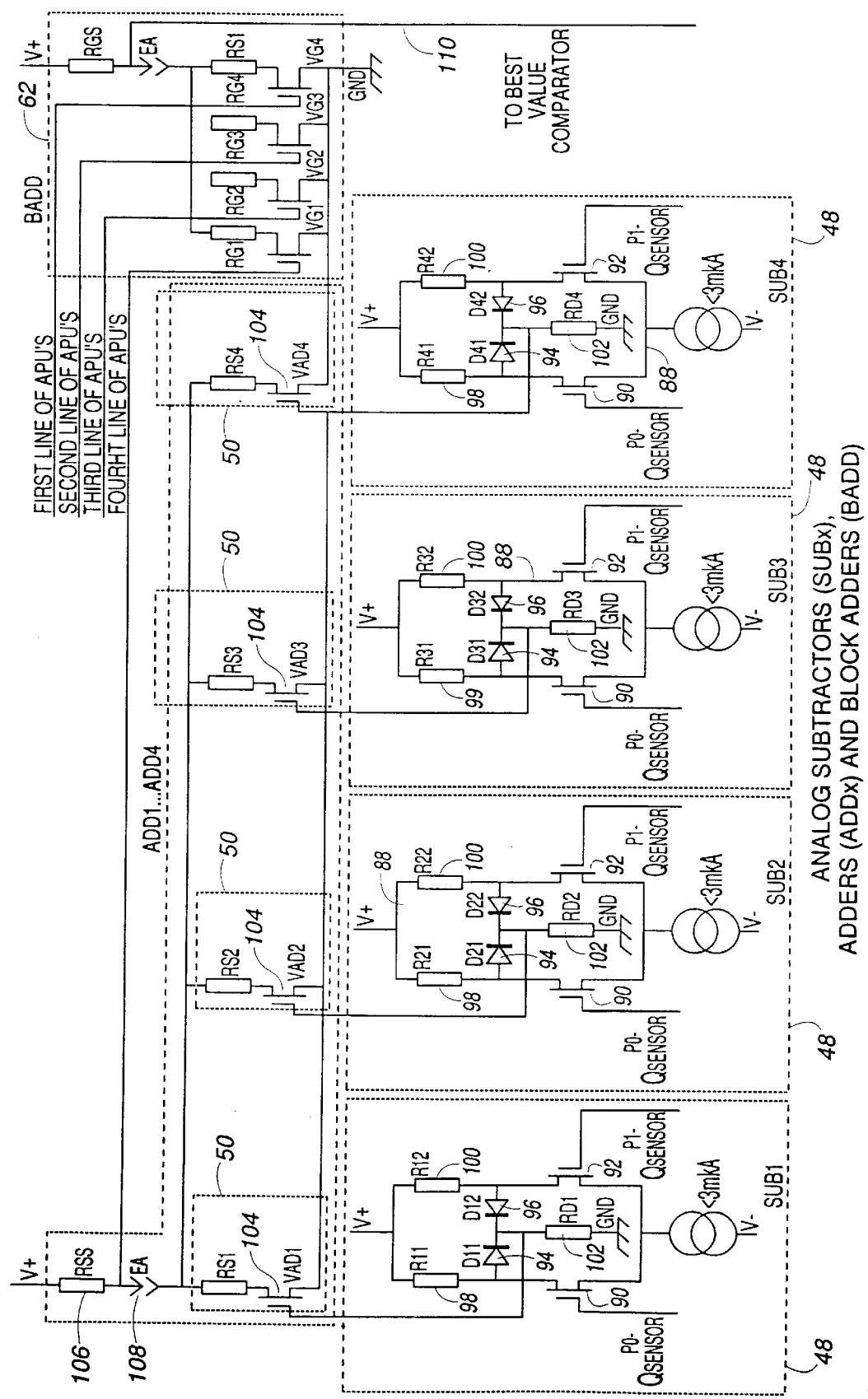
FIG. 7 shows a schematic diagram of one line of APE-related analog SUBtractors, analog ADD and BPU-related group ADD.

One possible arrangement of the above described circuitry is depicted in the schematic diagram, FIG. 7. Each of four depicted SUBTRACTORS (SUB1 ... SUB4) 48 comprises a differential amplifier 88 which consist of two FETs 90, 92, one of which is a Qsensor P1 and the other is P0. Special circuitry of two diodes 94, 96 and resistors 98, 100 is installed to rectify the bipolar output signal of a differential amplifier 88, and to perform nonlinear transformation of the signal (in one particular case, raise the numerical equivalent to a power of two). The output of a SUBtractor 48 creates a voltage drop on the resistor RD 102. This voltage drop is applied to a gate of ADDER FET's 104 and controls the current in a channel of transistors. Due to the parallel connection of FET's 104, the current through a resistor, RSS 106, will be equal to the sum of currents through all transistors, VAD1 ... VAD4 104. The voltage drop on resistor RSS 106 will be proportional to the sum of outputs of SUB1 ... SUB4 48. To achieve this goal, an additional requirement must be met; the voltage on all parallel connected FET's 104 must be constant. This can be achieved by the means of a voltage source EA 108. The output of all ADDER's 50 is connected to the input of a BADD 62. The BADD 62 functions in the same manner as ADDERS 50.

The functions of a PBU 54 are controlled by a MSCS 58. BADD 62 output is the most important signal for understanding the overall functioning of a PBU 54, and the entire chip.

As is shown in FIG. 5, the output 110 of a BADD 62 is connected to:

1. the first input 112 of a BEST VALUE COMPARATOR (BVC) 64, while the second input 116 of a BVC 64 is connected to a Qsensor 22 of a CCDCS-based BEST VALUE HOLD ELEMENT (BVHE) 60, and to the first input 122 of a CHARGE INJECTOR (CI) 68; and 2. the input 126 of an ANALOG HOLD ELEMENT (AHE) 128.

The output 130 of a AHE 128 is connected to a second input 135 of a CI 68.

The output 134 of a BVC 64 is connected to a third or Gate input 136 of a CI 68 and to a LOCK input 139 of AHE 128.

The output 138 of a CI 68 is connected to a CCD-based BVHE 60.

In addition, the MSCS 58 receives clock synchronization from an external Sequence Generator and controls the function of a MSSS 66, a MSQS 72 and a MSLOS 74.

The primary function of a BVHE 60 of a MSCS 58 is to lock and hold the lowest value of the sum of the square of differences that have been found during processing cycle up to a current moment in time, with respect to the relative coordinates represented by values in a MSSS 66, MSQS 72 and MSLOS 74 BVHEs 60.

HOLD ELEMENTS 60 of MSCS 58, MSSS 66, MSQS 72 and MSLOS 74 are separated from the horizontal lines of CCDCS elements by means of special CCD-based GATES 140.

Figure 9:
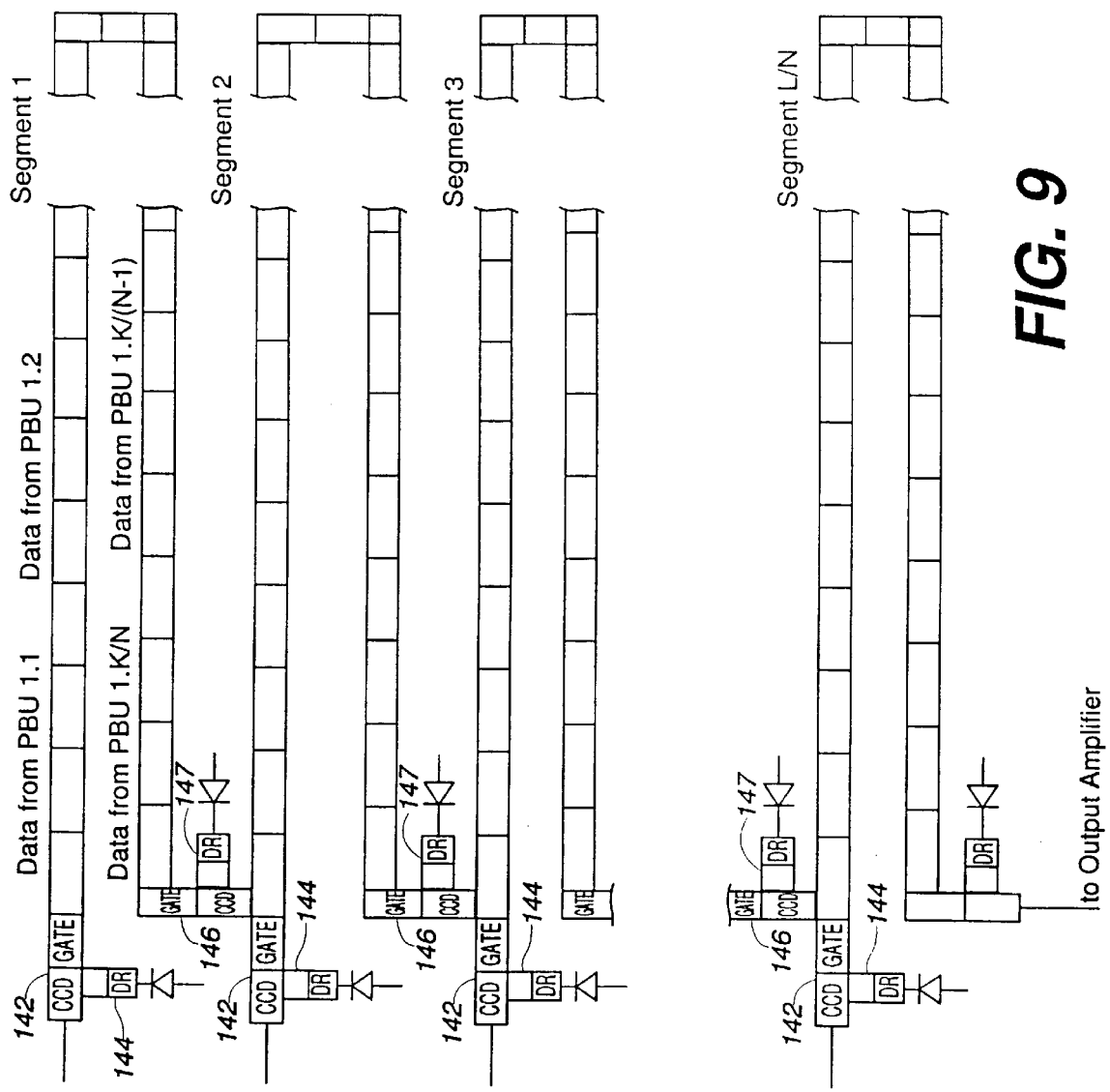
FIG. 9 shows the structure of a Output Shift Register (OSR) and related circuitry.

Referring now to FIG. 6 and FIG. 9, each segment 910 of an analog OUTPUT SHIFT REGISTER (OSR) 76 corresponds to one line of PBUs or four lines of APU's, and is responsible for draining the information out of these structures. After completing a processing cycle, each PBU 54 generates four values—three coordinate related values, "SPIRAL", "QUADRANT" and "OFFSET", and one quality descriptor from MSCS. Respectively each segment of OSR 76 has enough space to hold four values from one line of PBUs, which is the reason the capacity of one segment of an OSR is equal to the amount of information that can be stored in one TV line or in one line of APU's. The beginning of each segment of OSR 76 is connected to the left side of one uppermost line of CCDCS of the corresponding line of PBU's by means of a GATE 142. A DRAIN element 144 is also connected to the same CCDCS element as a GATE 142. Each segment of OSR 76 is connected in series with the next one by means of a CCD GATE 146 and DRAIN 147. This configuration permits two modes of operation of an OSR 76—LOAD mode and DRAIN mode. The end of the last lowest segment is connected to an OUTPUT AMPLIFIER 148 and to a DRAIN element 150.

The OVERSCAN BUFFER AREA 78 surrounds the entire 2D structure (or Processing Area) of APE's 20, and comprises its non-processing extension. OVERSCAN BUFFER AREA 78 allows a PRP chip 64 to accommodate all the charges that otherwise would be displaced and destroyed during the SPIRAL SEARCH algorithm. The width of this area is equal to the radius of the SPIRAL SEARCH. Each pixel site of this area has a special SHELTER element 161 associated with it. The main purpose of this element is to hide pixel values and protect them from destruction during pipelined loading of the NEXT and REFerence frames. DRAIN elements 154 are connected to the end of the LOAD REGISTER (LR) 80, FEEDBACK REGISTER (FOR) 82 and to the end of each line and row of CCDCS. The main purpose of the DRAIN elements is to zero all unwanted charges that could be introduced during the relatively long time of chip operation due to thermal electrons being generated, and other undesired effects that could possibly interfere with proper chip operation.

Each pixel site of the LR 80 is connected to a corresponding pixel site of the uppermost line of an OVERSCAN BUFFER AREA 78 by means of a CCD-GATE. This solution allows entry of each TV line into the processing structure when the line is ready, and requires only a few clocks. Also, several lines can be buffered and downloaded into a processing area simultaneously in order to reduce overhead time.

Each pixel site of FOR 82 is connected to a pixel site of the outermost, left side row of an OVERSCAN BUFFER AREA by means of a CCD-GATE. This solution allows entry of each row of REFerence frames into the processing structure when the row is ready, and requires only a few clocks. Also, several rows can be processed simultaneously in order to reduce overhead time.

DESCRIPTION OF CHIP OPERATION

The following description will refer to processing of one color component of an incoming video signal. The PRP chip 64 is capable of holding two sequential (previous and current) video frames in its internal analog registers, and during the same time, load two more frames—next and reference. In parallel with loading the next frame, the chip 64 will search for similarities in the original image of a current frame (P1) and a previous frame (P0), which have been shifted relative to a current frame on M pixels in a line, and P pixels in a row, according to the SPIRAL SEARCH algorithm.

Because of the inherent parallel structure of a PRP chip 64, it is possible to generate the results of a comparison of two-2D arrays (regardless of size) in only two clocks (for two clock electrode CCDs). Because of the motion nature of live images of video in many cases, the same object in two sequential video frames can be localized in different pixel coordinates. In this case, to be able to find a new location of an object in the current frame relative to a previous frame, it may be necessary to perform a search of all available pixel space. However, in most cases a search in a 64 pixel radius, or in a square measuring 128×128 pixels will impart successful results. Therefore, an estimate of search time is 128×128×2=32,768 clocks, or at a 10 Mhz clock rate, 305 frames/sec, or ten times faster than real time.

All chip descriptions assume the clock sequence generator and decision making circuit are allocated from the chip, and will not be described herein.

Referring again to FIGS. 4 and 6. During reset a special DRAIN sequence forces all charges to be drained from all CCD sites. This sequence consists of several steps:

1. External logic zeros input pins "VidIn" 156 and "RefIn" 158 and sets CCD-GATES associated with the outputs of corresponding input amplifiers to a high energy level, which prevents external circuitry from generating charges. At the same time, all CHARGE INJECTORS (68 of FIG. 4) in all MSU's 58, 66, 72, 74 are disabled. The sequence generator forces the PRP 64 to drain the charges from all STK 42, BUF 40, REF 44 and P0 38 (FIG. 3 and FIG. 4) sites, transfers them onto the horizontal lines of the CCDCS, and locks them in place. SHELTER sites 161 (FIG. 6), associated with the OVERSCAN AREA 78, direct their charges into adjacent vertical or horizontal CCDCSs, and locks them in place. The OUTPUT SHIFT REGISTER 76 is separated from the Processing Area by elevating the energy level of SEGMENT GATES 142, and at the same time all SEGMENTS are connected serially for GO-THROUGH operation by means of enabling CCD GATES 146 and disabling DRAINs 148. All these events combined require only two clocks.

2. All controllable horizontal CCD elements are transformed into a high energy level, which forces all charges to be pooled into vertical columns, and are kept in this state until the end of the DRAIN sequence. This creates vertical channels for charge draining. The external sequence generator forces all charges to be moved down along the columns of CCDCS elements in a vertical direction down to DRAIN ELEMENTS 154. 1216 clocks are required to perform this for 480 TV lines and 128 pixels in an OVERSCAN AREA 78. Charges from the OUTPUT SHIFT REGISTER 76 will move down and will be drained at the same time. A 640×480 pixel image structure requires 76,800 clocks. This completes the DRAIN sequence.

After DRAIN sequence has completed, a special TEST/AUTOCALIBRATE sequence can be performed. The TEST/AUTOCALIBRATE sequence will be highly useful for diagnostic purposes and digital tuning:

1. External logic uses "RefIn" 158 chip input to load two predefined, sequential frames of data. The first frame is loaded into the P0 plane and the second into P1 plane. In one case, the first frame could be solid black and the second solid white, (other, more advanced combinations could be implemented). In this case, the output of a chip can be predicted.

2. Sequence generator initiates the PROCESSING SEQUENCE (see below).

3. After processing is complete, external logic (such as a dedicated processor and associated software or a general purpose computer under software control) analyzes differences between real and expected outputs of a chip and generates coefficients to implement further interpretation and adjustment of chip outputs.

4. At the end of the TEST/AUTOCALIBRATE sequence, the DRAIN sequence is executed again to clear the chip.

After the RESET and TEST/AUTOCALIBRATE sequences are completed, the PROCESSING SEQUENCE begins again. External logic is now idling, awaiting VSYNC from an external video source.

After that time, incoming pixels are shifted into the CCD LR 80. At the end of the TV line, the external video source generates HSYNC. This signal initializes the "Line Loading Sequence" of the External Sequence Generator. The "Line Loading Sequence" is comprised of the following steps:

1. Preserves current frame pixel values of PLANE1 36 in STK site 42 (FIG. 3 and 4) and values from CCD elements 79 of OVERSCAN AREA 78 in adjacent SHELTER sites 161 (FIG. 6) (2 clocks);

2. Loads the next frame pixel values from BUF sites 40 into PLANE1 36 (2 clocks);

3. Shifts down all rows of pixels attached to the top pixel site of the new incoming TV-line or LOAD REGISTER (LR) 80 [2x(Overscan_Radius+1) clocks];

4. Saves the next frame pixel value from PLANE1 36 into BUF site 40 (2 clocks);

5. Reloads current frame pixel value from STK site 42 into PLANE1 36 (2 clocks).

All steps of the "Line Loading Sequence" 1 through 5 occur during the same time for all pixels, and takes 10 clocks plus the size of the search diameter for each TV-line. Most of the time required by this sequence is used to save and reload a current PLANE1 and the next frame pixel values, and transfer the data through the OVERSCAN BUFFER AREA 78. For short TV-lines (e.g. 160 pixels per line) and a wide search area, that amount of time may become significant and may decrease chip performance. To avoid this problem, double, or greater, buffering of the LOADING REGISTER 80 can be implemented. In this case it is necessary to initialize the "Line Loading Sequence" procedure only once for two or more TV lines.

After all TV lines of the next frame of the image are loaded into BUF sites 40 in the chip 64, and at the beginning of a VSYNC, the Sequence Generator will initialize a frame updating process:

- all unnecessary pixel information related to a previous frame will be drained by directing charges from all P0 sites 38 to respective DRAIN sites 46. This procedure will free-up space in processing area;
- charges from all P1 sites 36 will be directed to a respective P0 sites 38. This procedure will replace the previous frame with the current frame;
- charges from all BUF sites 40 will be directed to respective P1 sites 36. This procedure will replace the current frame with next frame.

By this process the earlier defined Next frame and Current frame will become the new Current frame and Previous frame respectively.

Figure 8:
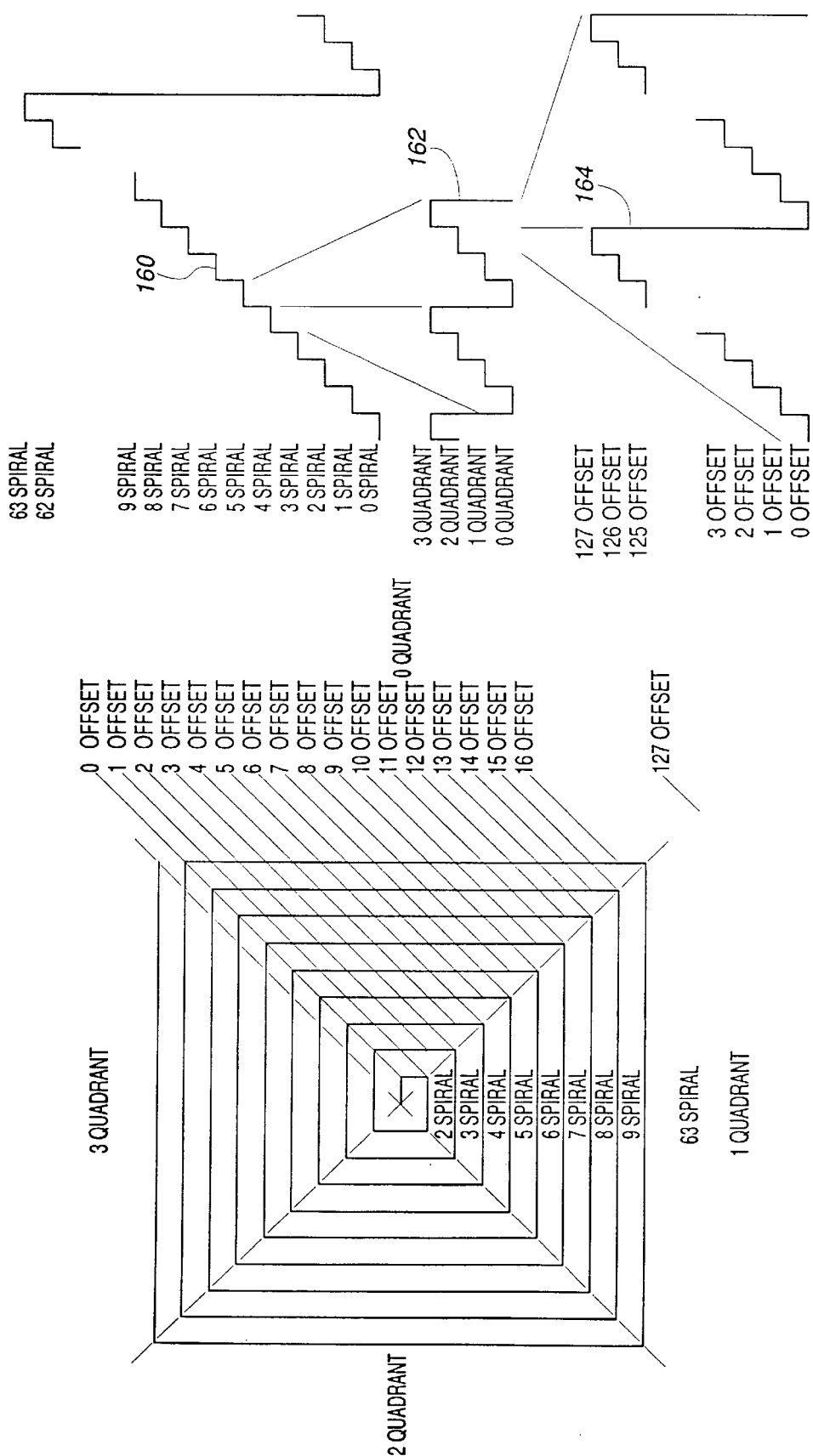
FIG. 8 demonstrates diagrammatically a SPIRAL SEARCH algorithm and time related requirements for three components of a sequence.

After pixel information from previous and current frames is successfully loaded into P0 and P1 sites 38, 36 respectively, the Sequence Generator will initialize the processing cycle. For purposes of clarity is assumed that the search area is 128×128 pixels in size, in this example the spiral search algorithm is used and, therefore, the Processing Cycle consists of 64 full spirals. However, other algorithms could also be implemented. Referring now to FIG. 8, the External Sequence Generator is responsible for maintaining three ladder-shaped (or quasi-saw-shaped) analog outputs:

1. First—ladder-shaped voltage output 160 requires a maximum of 64 steps, and each step represents one LOOP of the spiral
2. Second—ladder-shaped voltage output 162 requires a maximum of 4 steps, and each step represents one of four possible QUADRANTs in which a pixel could be located.
3. Third—ladder-shaped voltage output 164 requires a maximum of 128 steps and each step represents the OFFSET in pixels from the beginning of a quadrant.

Each step of a SPIRAL includes four QUADRANT steps and each QUADRANT step in turn consist of up to 128 OFFSETs.

Splitting a matching block coordinates descriptor into three components provides the major advantage of function reliability of PBU's 54 because of its inherent analog nature. For overall chip and entire video compressor operation, it is much more important to have precise, error free information regarding relative locations of matching groups of pixels, rather than pixel intensity alone. In the Spiral Search procedure described above, a small degree of inconsistency in the SPIRAL number or OFFSET components of an address will introduce almost insignificant (not more than one or two pixels) corruption of an image, but an error in the second component may introduce, in worst case, a 128-pixel mistake. However, the second component has a very strong immunity against errors because it is highly quantified. Another advantage of splitting a matching block coordinates descriptor into three components is the addition of a BVHE 60 of a MSCS 58 as a fourth component value to an entire REGISTER 56 will perfectly fit the DRAIN SEQUENCE function of the chip 64.

Generally speaking, the processing cycle occurs at the same time pixels from the next frame are being loaded into BUF sites 40 and the contents of the OUTPUT SHIFT REGISTER 76 are being drained from the chip. The processing cycle consist of three repetitive stages:

1. Step
2. Compare
3. Modify (optional if the comparative condition-is true)
   The number of repetitions depends upon the system requirements and specifications of the search area.

"Step" shifts the entire 2D array of the P1 pixel plane one pixel position up, right, down or left, according to the spiral algorithm and in relation to the change in voltage applied to the clock electrodes (3 clocks per pixel). In addition to this, the Sequence Generator updates all three saw-shaped voltage outputs 160, 162, 164. Each of the three saw-shaped voltages 160, 162, 164 are applied to multiple CHARGE INJECTORS 68 in all MACROCELL SEQUENCE SUBUNITS (FIGS. 4 and FIG. 5). Therefore, the CHARGE INJECTORS 68, are able to introduce a charge proportional to the input ladder-shaped voltage, applied to the CI 68 in the corresponding CCDCS hold elements 60

Feedback from Qsensors 22 to a CI 68 will maintain the correct amount of electricity being introduced into the CCDCS hold elements 60.

A Qsensor 22 is comprised of a Field Effect Transistor (FET), embedded into CCDCS element 20 FIG. 1 and FIG. 2 in such a way that electrons being localized in the CCD site will affect the level of current through the transistor. A simple analog SUBtractor 48 is depicted by FIG. 7. This schematic diagram shows how a SUB 48 converts the bipolar output (P0–P1 may have a negative, zero or positive value) of a differential amplifier 88 into a unipolar value, or takes the module of difference (as shown by Equation 1). In addition the diodes 94, 96 and resistors 102 allow the SUB 48 to perform nonlinear transformation of the absolute value of the difference, and in a particular case, to raise the difference to a power of two, because of the non-liner characteristics of diodes.

After 3 clocks of a "Step" have completed, the entire 2D matrix of elements P1 will be shifted one pixel in a predefined direction and voltage proportional to the new pixel intensity of frame P1 in a new location is applied to the first input of SUBtractor 48. Voltage, proportional to the charge level in a correspondent pixel of frame P0, is applied to the second input of the SUBtractor 48. Outputs of all SUBtractors 48 are then added to each other by daisy-chained ADDers 50. Four ADDers 50 in each line of APE's 20 generate voltage proportional to the sum of squares of differences of modules on resistor RSS 106. The output of the right-hand ADDer 50 in each line is connected to a four-input BLOCK ADDERS 62 in the MACROCELL SEQUENCE CONTROL SUBUNIT 58. Output 110 of this ADDer 62 is connected to the first input 112 of a BVC 64.

"Compare" stage requires one clock of the Sequence Generator. The second input 116 of the BVC 64 FIG. 5 is connected to a Qsensor 22 of a BVHE 60. The output 134 of a BVC 64 becomes active if the voltage on the first input 112 is less than the voltage on the second input 116, which means that PBU 54 have found the location of a new 4×4 pixel group in the previous frame that matches better with a corresponding pixel group of the current frame. At the same time, the analog value from the BADDER 62 is locked in a ANALOG HOLD ELEMENT (AHE)128. This is done to preserve the current value of the output of a BADDer 62 during one clock to produce a MODIFY state. If the output 134 of a BVC 64 is active, a MODIFY state will follow a STEP state.

"Modify" state is three clocks long, but does not consume additional time because it shares clocks time with the next "Step" state. Not all PBUs make the transition into a "Modify" state at the same time. Two events occur during this state:

The first event requires two clocks for completion. It flushes charges from all CCDCS associated with BVHE 60 of all subunits SPIRAL 66, QUADRANT 72, OFFSET 74 and CONTROL 58 of correspondent PBU 54 to zero value by directing electron packets to their respective DRAINs 70. This restores the conditions that will allow BVHE sites 60 to accept charges from appropriate CIs 68.

The second event requires one clock, during which time actual modification of the data occurs. The BVC output 134 is synchronized by the third clock of the Sequence Generator, which activates the CHARGE INJECTORS 68 of all MSSUs 58, 66, 72, 74 of the current PBU 54. The first input 122 of all CI's 68 is connected to a corresponding Qsensor 22 of referenced BVHEs 60 and provides feedback. The second inputs of CI's 68, SPIRAL 66, QUADRANT 72 and OFFSET 74 are connected to the corresponding ladder-shaped voltage output of the Sequence Generator. Note that the CHARGE INJECTOR 68 of a MSCS 58 does not connect to any external circuitry. Instead, the second input 135 of the CI 68 of a MSCSU 58 is connected to an output 130 of the BADDers AHE 128 which holds a quality descriptor of 4×4 block of pixels in the previous location. It should be noted that, at this time, the next "Step" is already underway and the P1 site 36 already contains a value received from a new location and output 110 of BADDer 62 will change its value to a new one, which will corrupt the value in BVSE 60. This is the reason for maintaining the previous value in the AHE 128.

As a result of implementing this algorithm, the chip is able to retain in memory in the SPIRAL COORDINATE SYSTEM the coordinates of groups of pixels in the previous frame relative to the current frame with the smallest mismatched values. While the SPIRAL SEARCH is taking place, the current frame pixel plane P1 is shifted out of the processing area a distance of up to 64 pixels in any direction. As a precaution to ensure that the 64 outermost pixels of a frame are not overlooked during processing, a special OVERSCAN SEARCH BUFFER AREA 78 is introduced. This area is comprised of an extension of the Processing Area, but it does not include processing elements such as Qsensors, P0, BUF, STK, DRAIN, SUB and ADD. However, it does include special SHELTER elements or SH 161 (FIG. 6). The main purpose of the SH elements 161 is to prevent destruction of pixel values of a current frame, which have been shifted into the OVERSCAN AREA 78 during processing, by loading a line from the TV-LINE SHIFT REGISTER 80 or row from the FEEDBACK REGISTER 82.

The functioning of the entire PRP chip 64 is explained as follows (see FIG. 6):

A two dimensional array of PBUs 54 is surrounded by an OVERSCAN BUFFER AREA 78. A TV-LINE SHIFT REGISTER 80 is coupled to the top line of CCDs of OBA 78. The line of DRAIN elements 154 are coupled to the bottom line of CCDs of OBA 78. When the next HSYNC is generated by an external TV source, the Sequence Generator begins executing a LINE LOADING SEQUENCE. At first it preserves charges from P1 sites 36 in corresponding STK sites 42. Those charges that have been shifted out of the processing area into an OVERSCAN AREA 78 will be preserved in SH elements 161. After that, the contents of BUF sites 40 of the entire chip 64 will be forced to move into P1 sites 36. An entire column of CCDCS 152 with 64-sites (width of the search area) of OBA 78 and one correspondent pixel site attached to it (considering only one TV-line buffering) of TV-LINE SHIFT REGISTER 80, and at the bottom of it are 64-sites of OBA 78 and one DRAIN site 154, which creates a solid analog shift register with a drain at the end. The DRAIN 154 is necessary to flush all unwanted charges that are generated as a result of thermoelectricity, or electron losses during packet transfer. These excessive charges are mostly insignificant in a short time scale, but have a tendency to accumulate, and after a period of time are capable of destroying image consistency.

Loading data from the FEEDBACK REGISTER 80 occurs very much like that described above, with only small differences.

After completion of 16,384 "Steps", or searches, in a 128×128 pixel area, the entire array of Hold Elements in the MACROCELL SEQUENCE UNITS will contain analog information representing locations of best matching groups of pixels of a current frame relative to those in a previous frame. The DRAIN procedure takes place at this time, but it may require more time than is available (only a few milliseconds are available before next HSYNC, which may not be sufficient for large frame sizes).

The OUTPUT SHIFT REGISTER (OSR) 76 is responsible for synchronizing functions of the chip 64 with the external video source, and with the external processor which receives output data from the chip. The OSR 76 (see FIG. 9) is comprised of several segments 910, the number of which is equal to a number of lines of PBU's 54 (for 640×480 pixel image it is equal to 480/4 or 120). In the OSR SPLIT mode, each segment is loaded independently and simultaneously from a correspondent line of MSUs 56, which is part of PBU 54. The contents of the OSR 76 register are flushed from the chip in sequential order in the OSR GO THROUGH mode. The capacity of each segment is equal to the capacity of one line of PBU elements. Each segment has an origin and an end.

The following events occur in the SPLIT mode:
a. CCD GATEs 142 are in a low energy state that allows free charge transfer from horizontal lines of CCDCS elements of the processing area into correspondent segment 910 of OSR 76;
b. DRAINs 144 are in a high energy state, which prevents loaded charge packets from draining;
c. CCD GATEs 146 are in a high energy state, which separates all segments from the other;
d. DRAINs 148 are in a low energy state, which prevents accumulation of non-desirable charges in the origin of a segment.

In the GO THROUGH mode, states of all the above mentioned CCD GATEs 142 and 146, and DRAINs 144 and 148 will be reversed. This permits disconnection of the OSR 76 from the array of PBUs 54, and linking all of its segments 910.

This topology allows the content of all PBU's 54 to be flushed out in parallel, into corresponding segments of the OSR 76 in only 3×4×160 (or 1920) clocks for a 640×480 frame structure. This time is equivalent to the duration of one TV line.

After the contents of the PBU's 54 are flushed out, all chip resources are ready to process the next frame. Meanwhile the OSR 76 is switched into the GO THROUGH mode, and drains the charge packets from the chip.

In some cases it is necessary to load a REFERENCE frame to refresh the information in the chip, and to prevent video degradation. A special CCD based register, or FEEDBACK REGISTER 82, and REF sites 44 in every APE 20 are introduced for this purpose, and it is performed similar to video pixel loading, with only a single difference. The source of information is not an external video signal, but are analog pixel values that have been generated by an external processor.

For actual use the Pattern Recognition Processor is embedded into a relatively intelligent device with a microprocessor. This device provides control and clock signals for the PRP, and also uses the output of the PRP in accordance with a computer program for video signal processing. Typically, the initial frame of the video signal is digitized and stored in the memory associated with the computer. The output of the PRP essentially consists of analog information that locates corresponding blocks of pixels as the location changes from frame to frame. This analog location information is then digitized and stored in memory as well. Thus, by having the original digitized frame available, as well as the relative pixel locations in successive frames, the video signal can be reconstructed.

Further, after a series of frames have been processed, the differences between the successive frames and the original frame may be so great that there is not much pixel correspondence. If such a situation occurs, a new frame may become the reference frame and would be digitized and stored, the output of the PRP would then relate pixel locations to the new reference frame until, once again, pixel correspondence with subsequent frames is small. At that time, a new reference frame will be selected and digitized.

In addition to the above described concepts, many other applications could be implemented besides video processing algorithms. These applications include, but are not limited by 2D and 1D filtering, matrix transformation, audio recognition and so on.

The foregoing detailed description of the preferred embodiments of the present invention is provided for the purposes of illustration and not limitation. The described embodiments are capable of numerous substitutions, modifications, additions and deletions without departing from the scope of the invention as defined in the following claims.

I claim:

1. An apparatus for processing video information stored in a first and second video frame, wherein each video frame includes a two dimensional array of analog pixel elements and each pixel element is represented by a charge packet carried on a charge-coupled device (CCD) element, the apparatus comprising:

a matrix of CCD intersection points formed from two orthogonally-disposed arrays of CCD lines;

transport means for controllably moving a matrix of analog charge packets from the second video frame among the intersection points;

a plurality of pixel block units defined within the matrix of intersection points, each pixel block unit further comprising:

a two dimensional array of analog processing elements (APEs) integrally disposed with the CCD intersection points, each APE including:

a first CCD element for storing the magnitude of charge of a pixel element of the second video frame, the first CCD element being located at an intersection point;

a second CCD element for storing the magnitude of charge of a pixel element of the first video frame and previously stored at the first CCD element;

means for moving a packet of charge from the first CCD element to the second CCD element;

a subtractor operative to generate a difference output that is proportional to the magnitude of the difference in charge between the charges stored on the first and second CCD elements;

adding means for adding the difference output of the subtractor with an output of an adding means of an adjacently disposed analog processing element; and control means for controlling the movement of charge packets among the plurality of analog processing elements, the subtractor, and the adding means so that the adding and subtracting operations among all the analog processing elements occurs substantially simultaneously;

processing control means for controlling the transport of the matrix of charge packets of the second video frame within the intersection points in accordance with a predetermined processing pattern;

master summation means responsive to the subtractors of the plurality of APEs for generating a single signal that is representative of the summation of the difference outputs for the plurality of subtractors;

storage means for storing the minimum value of the master summation means over a plurality of summation calculations, wherein the plurality of summation calculations include calculations made as the matrix of charge packets of the second video frame is transported among the intersection points; and position indication means responsive to the storage means for storing position information;

whereby video information pertaining to the second frame of video information may be stored and communicated by the values stored in the storage means and the position indication means.

2. The apparatus as defined in claim 1, wherein the processing pattern includes a spiral-search algorithm.

3. The apparatus as defined in claim 2, wherein the position information stored by the position indication means includes spiral, quadrant and offset vectors calculated by the spiral-search algorithm.

4. The apparatus according to claim 1, wherein the master summation means includes a plurality of line summing means for calculating the summation of the difference outputs in a row of APEs.

5. The apparatus according to claim 4, wherein the master line summing means include field-effect transistors, wherein source nodes of the field-effect transistors are electrically connected in parallel, and the gate of each field-effect transistor is responsive to a subtractor, whereby the summation of the current drawn through the source nodes is representative of the summation of the difference outputs in a row of APEs.

6. An apparatus for pipelining successive frames of video information represented by a two-dimensional array of pixels, wherein each pixel comprises a packet of charge, the apparatus comprising a two dimensional array of analog processing elements each having an intersection point and a processing element that carry corresponding charge packets from successive video frames, the analog processing elements are disposed in a two-dimensional array wherein each intersection point is in communication with four intersection points of adjacent analog processing elements, the apparatus comprising:

a line buffer having a plurality of CCD elements for storing a plurality of charge packets, the line buffer in communication with a first row of intersection points;

receiving means for receiving a stream of charge packets representative of a row of pixels of the two dimensional array of pixels and shifting the received charge packets into the line buffer;

a buffer element associated with each analog processing element, the buffer element in communication with the intersection point associated with the corresponding analog processing element, for storing a packet of charge;

a stack element in communication with an intersection point associated with the corresponding analog processing element, for storing a packet of charge the stack element and buffer element being in communication with a common gate; and charge moving means for controllably moving charge packets among the intersection points, buffer elements, and stack elements, in response to a complete row of charge packets being received and shifted into the line buffer.

7. The apparatus as defined in claim 6, wherein the charge moving means includes means for shifting charge packets in the intersection points into the associated buffer elements.

8. The apparatus as defined in claim 7, wherein the charge moving means includes means for shifting charge packets in the stack elements into the associated intersection points.

9. The apparatus as defined in claim 8, wherein the charge moving means includes means for shifting charge packets in the intersection points into the intersection points of an adjacent row.

10. The apparatus as defined in claim 9, wherein the charge moving means includes means for shifting the charge packets in the intersection points into the associated stack elements.

11. The apparatus as defined in claim 10, wherein the charge moving means includes means for shifting the charge packets in the buffer elements into the associated intersection points.

12. The apparatus as defined in claim 9, further including means for shifting the charge packets in the line buffer into a first row of intersection points.

13. In an apparatus for processing successive frames of video information represented by a two-dimensional array of pixels, wherein each pixel comprises a packet of charge, the apparatus comprising a two dimensional array of analog processing elements each having a buffer element CCD, a stack element CCD, and an intersection point disposed for intercommunication of charge packets, wherein each intersection point is further disposed in communication with four intersection points of adjacent analog processing elements, a method of pipelining the processing of a fist frame of video information with the receipt of a second, successive frame of video information comprising the steps of:

(a) receiving a stream of charge packets representative of a row of pixels of the two dimensional array of pixels;

(b) shifting the received charge packets into a line buffer;

(c) entering a shift-state after an entire row of pixel information has been shifted into the line buffer;

(d) shifting the charge packets in the intersection points into the associated buffer elements;

(e) shifting the charge packets in the stack elements into the associated intersection points;

(f) shifting the charge packets in the intersection points to the adjacent row of intersection points, and shifting the charge packets in the line buffer into a first row of intersection points;

(g) shifting the charge packets in the intersection points into the associated stack elements; and (h) shifting the charge packets in the buffer element into the associated intersection points.

14. The method as defined in claim 13, wherein each analog processing element further includes an associated processing CCD in communication with the stack CCD and intersection point, the method further including the steps of:

(i) entering a new-frame state after receiving the last row of pixels in the two-dimensional array of pixels;

(j) discarding the charge packets in the intersection points;

(k) shifting the charge packets in the processing CCDs into the associated intersection points; and (l) shifting the charge packets in the stack elements into the associated processing CCDs.

15. The method as defined in claim 14, wherein each analog processing element further includes an associated drain element in communication with the intersection point, wherein the step of discarding the charge packets in the intersection points includes shifting the charge packets in the intersection points into the associated drain element.

16. An apparatus for pipelining successive frames of video information represented by a two-dimensional array of pixels, wherein each pixel comprises a packet of charge, the apparatus comprising a two dimensional array of analog processing elements each having an intersection point and a processing element that carry corresponding charge packets from successive video frames, the analog processing elements are disposed in a two-dimensional array wherein each intersection point is in communication with four intersection points of adjacent analog processing elements, the apparatus comprising:

a line buffer having a plurality of CCD elements for storing a plurality of charge packets, the line buffer in communication with a first row of intersection points;

receiving means for receiving a stream of charge packets representative of a row of pixels of the two dimensional array of pixels and shifting the received charge packets into the line buffer;

a buffer element associated with each analog processing element, the buffer element in communication with the intersection point associated with the corresponding analog processing element, for storing a packet of charge;

a stack element in communication with an intersection point associated with the corresponding analog processing element, for storing a packet of charge; and charge moving means for controllably moving charge packets among the intersection points, buffer elements, and stack elements, in response to a complete row of charge packets being received and shifted into the line buffer.

17. The apparatus as defined in claim 16, wherein the charge moving means includes means for shifting charge packets in the intersection points into the associated buffer elements.

18. The apparatus as defined in claim 17, wherein the charge moving means includes means for shifting charge packets in the stack elements into the associated intersection points.

19. The apparatus as defined in claim 18, wherein the charge moving means includes means for shifting charge packets in the intersection points into the intersection points of an adjacent row.

20. The apparatus as defined in claim 19, wherein the charge moving means includes means for shifting the charge packets in the intersection points into the associated stack elements.

21. The apparatus as defined in claim 20, wherein the charge moving means includes means for shifting the charge packets in the buffer elements into the associated intersection points.

22. The apparatus as defined in claim 19, further including means for shifting the charge packets in the line buffer into a first row of intersection points.

23. In an apparatus for processing video information contained in first and second video frames, wherein the video frames include a two dimensional array of analog pixel elements each represented by a charge packet, a method for efficiently storing and communicating video information comprising the steps of:

shifting a matrix of charge packets of the first video frame into a matrix of first storage elements;

collectively moving a matrix of charge packets of a corresponding portion of the second video frame into a matrix of second storage elements, wherein each storage element of the second matrix is coupled with a corresponding storage element of the first matrix;

computing a value proportional to the magnitude of the difference between each coupled storage element;

summing the individual magnitudes generated in the computing step;

repeating the moving, computing, and summing steps a plurality of times and over a predetermined pattern of movement;

storing the smallest value computed by the summing step over the plurality of calculations computed over the repeated execution of the pattern of movement;

determining and saving position information, wherein the position information identifies a displacement of the second matrix from the first matrix for the location associated with the storing step.

* * * * *